United States Patent
Ketonen (10) Patent No.: US 6,374,083 B1
(45) Date of Patent: Apr. 16, 2002

(54) APPARATUS, AND ASSOCIATED METHOD, FOR SELECTIVELY MODIFYING CHARACTERISTICS OF THE RECEIVE SIGNAL RECEIVED AT A RECEIVING STATION

(75) Inventor: Veli-Pekka Ketonen, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/259,845

(22) Filed: Mar. 1, 1999

(51) Int. Cl.$^7$ ................................................ H04B 1/16
(52) U.S. Cl. ...................... 455/67.1; 455/561; 455/423; 455/425
(58) Field of Search .................... 455/14, 561, 67.1, 455/249.1, 250.1, 281.1, 282, 289, 291, 423, 424, 425

(56) References Cited

U.S. PATENT DOCUMENTS

| | | | |
|---|---|---|---|
| 4,961,057 A | * 10/1990 | Ibukuro | ...................... 330/295 |
| 5,457,811 A | * 10/1995 | Lemson | ...................... 455/67.1 |
| 5,634,191 A | * 5/1997 | Beasley | ...................... 370/279 |
| 5,737,687 A | * 4/1998 | Martin et al. | .................. 455/14 |
| 5,754,943 A | * 5/1998 | Arai et al. | ..................... 455/14 |
| 6,018,644 A | * 1/2000 | Minarik | ........................ 455/82 |

* cited by examiner

Primary Examiner—Daniel Hunter
Assistant Examiner—Alan T. Gantt
(74) Attorney, Agent, or Firm—T. Brooke Hayes (57) ABSTRACT

Apparatus and an associated method for improving the receiver portion of a radio receiver, such as the receiver portion of a radio base station operable in a cellular communication system. A mast head amplifier is provided at a mast head to amplify electrical signals formed by the mast head. The amplification level of the mast head amplifier is selected to be relatively large to more than overcome the loss and sensitivity degradation of the amplified signal when conducted therethrough to other portions of the receiver. An attenuator which exhibits a selected level of attenuation is positioned in-line between the feeder cable and the remaining portions of the receiver. The attenuation level is selected to provide a constant level of gain in a signal provided to the remaining portions of the receiver.

15 Claims, 7 Drawing Sheets

| MHA GAIN | FEEDER LOSS | ADJUSTABLE ATTN | NET GAIN TO MIX1 |
|---|---|---|---|
| 30 dB | 0 dB | 10 dB | 20 dB |
| 30 dB | 2 dB | 8 dB | 20 dB |
| 30 dB | 4 dB | 6 dB | 20 dB |
| 30 dB | 6 dB | 4 dB | 20 dB |
| 30 dB | 8 dB | 2 dB | 20 dB |

APPARATUS, AND ASSOCIATED METHOD, FOR SELECTIVELY MODIFYING CHARACTERISTICS OF THE RECEIVE SIGNAL RECEIVED AT A RECEIVING STATION

The present invention relates generally to a manner by which to overcome antenna feeder cable loss at a receiving station, such as a radio base station of a cellular communication system. More particularly, the present invention relates to apparatus and an associated method, by which a receive signal, received at the receiving station, is amplified to more than overcome the effects of the cable loss. Thereafter, the signal is selectively attenuated, to thereby to provide a receive signal, with a selected amount of gain, to the receiver circuitry. Operation of an embodiment of the present invention provides a receive signal to the receiver circuitry in a manner which exhibits a low noise figure and high linearity.

BACKGROUND OF THE INVENTION

A communication system is formed, at a minimum, by a transmitting station and a receiving station interconnected by a communication channel. Information to be communicated by the transmitting station to the receiving station is converted into a form to permit its transmission upon the communication channel. Once converted into the form to permit its transmission upon the communication channel, a communication signal, formed at the transmitting station, is transmitted upon the communication channel to be received at the receiving station. Once received at the receiving station, the informational content of the signal is recovered.

A radio communication system is a type of communication system in which the communication channel is formed of a radio channel defined upon a portion of the electromagnetic spectrum. Because a fixed connection is not required to form the communication channel between the transmitting and receiving stations, communications can be effectuated pursuant to the radio communication system when a fixed connection between the transmitting and receiving stations would otherwise be impractical.

A cellular communication system is exemplary of a radio communication system. A cellular communication system is further a multi-user communication system which permits concurrent communication by a plurality of different users. A cellular communication system includes network infrastructure with which mobile stations communicate by way of radio channels. The network infrastructure includes a plurality of spaced-apart radio transceivers, referred to as radio base stations, positioned at selected locations throughout a geographical area to be encompassed by the cellular communication system.

Communication is effectuated between a radio base station of the network infrastructure and a mobile station positioned proximate thereto. Transmitter circuitry of the mobile station modulates the information which is to be communicated to the base station by modulating the information upon a radio frequency signal. Typically, the signals generated by a mobile station are of relatively low power levels, mostly less than three watts, and usually six hundred milliwatts. As the electromagnetic spectrum is not a noise-free communication medium, noise and other interfering signals are also sometimes introduced upon the communication signal transmitted by the mobile station upon a radio channel.

The radio base station must be able to detect the transmitted signal, subsequent to propagation upon the radio channel. As the transmitted signal is propagated upon the radio channel, the signal is susceptible to the effects of noise and other interfering signals, as well as normal signal attenuation.

A radio base station typically includes one or more antenna transducer elements operable to detect the electromagnetic signals transmitted thereto by a mobile station. An antenna transducer element converts the transmitted signals from electromagnetic form into electrical form. To detect better the electromagnetic signals, conventional techniques are typically utilized, including, for instance, positioning the antenna transducer at an elevated position. By elevating the position of the antenna transducer, physical obstructions are less likely to obstruct, or otherwise interfere, with the transmission of the signal to the radio base station upon the radio channel. The antenna transducer, and associated elements, commonly referred to as a mast head, is coupled to other circuitry of the radio base station by way of a cable, such as a coaxial cable.

However, cable loss is typically associated with the cable. That is to say, when a signal, received by the mast head and transduced into electrical form, is conducted through the cable to other circuitry of the radio base station, the electrical signal is attenuated by an amount corresponding to, and defined by, the cable loss.

Conventionally, in an attempt to overcome such cable loss, an amplifier, referred to as a mast head amplifier (MHA) is positioned at the mast head to amplify the electrical signal prior to its conduction through the cable. The amplification level conventionally selected corresponds to the expected level of cable loss. Thereby, subsequent to conduction of the signal through the cable, the signal level of the signal, when applied to other circuitry of the radio base station, is restored to its original level, i.e., the level of the signal prior to its conduction through the cable. Amplification of the signal with a mast head amplifier, however, also amplifies non-signal components of the signal. That is, noise is also amplified by the mast head amplifier.

For instance, if the amplification of the mast head amplifier is about 5.0 decibels, and a noise figure is of 2.5 dB, and the cable loss is of a corresponding 5.0 decibel level, a zero decibel gain results, but the 2.5 decibel noise figure degrades the sensitivity of the signal applied to the other portions of the radio base station. The normal receiver noise figure contribution is not decreased because there is no net gain from the mast head amplifier and antenna cable.

To improve the noise figure and sensitivity, the gain of the mast head amplifier can be adjusted to be greater than the cable loss, and the front end of the radio base station exhibits a net gain. The resultant effect of the increased amplifier gain is to reduce the resultant noise figure. And, as a result, improved sensitivity results. This type of arrangement is sometimes referred to as an "over gain principle."

This type of arrangement, however, also suffers from disadvantages. While the total noise figure is reduced, the signal and interference levels provided to the other portions of the radio base station are increased. Subsequent to conduction through the cable, the signal is typically applied to a low noise amplifier (LNA). Low noise amplifiers conventionally exhibit relatively low third order intermodulation intercept points. And, such amplifiers generally are constructed to be compatible with signal levels of signals directly available from a mast head. The third order intermodulation intercept point describes the level of interference that two signals can generate to fall at a certain frequency. In practice, the certain frequency is thereafter not useful in the presence of such interference. The two signals together form intermodulation products that, in a cellular communication system, can cause dropped calls. The original signal is typically of a much smaller magnitude than the intermodulation product and the network infrastructure of the communication system is unable to cause the mobile station to generate signals on another channel in time to prevent the dropping of the call.

Another disadvantage of this arrangement is that the RSSI (receiver signal strength indicator) of the receiver portion of the radio base station also becomes inoperable. That is to say, the RSSI operation is affected by the positioning of the external amplifier at the front end of the radio base station.

An improved manner by which to overcome the problems associated with cable loss exhibited at a receiving station, such as a radio base station, would therefore be advantageous.

It is in light of this background information related to receiving stations operable in a radio communication system, that the significant improvements of the present invention have evolved.

SUMMARY OF THE INVENTION

The present invention, accordingly, advantageously provide apparatus and an associated method, by which to provide a receive signal of improved noise and linearity to receiver circuitry of the receiving station.

Operation of an embodiment of the present invention overcomes the effects of antenna feeder cable loss at a receiving station, such as a radio base station of a cellular communication system.

In one aspect of the present invention, a mast head amplifier is positioned to amplify electrical signals representative of a receive signal detected by the mast head. The amplification level of the mast head amplifier is selected to be significantly greater than the cable loss exhibited by a cable extending between the mast head and the receiver circuitry of the radio base station. Subsequent to amplification of the signal at the mast head amplifier, the signal is conducted through the cable extending through the mast head and the receiver circuitry of the radio base station. The cable loss associated with the cable reduces the signal levels of the signals conducted therethrough. However, because the amplification level of the mast head amplifier is selected to be greater than the cable loss associated with the cable, the signal, subsequent to conduction through the cable is larger than when applied to the mast head amplifier. An attenuator is positioned between the cable and the receiver circuitry of the radio base station. The attenuator selectively attenuates the signal, subsequent to its conduction through the cable and prior to its application to the receiver circuitry of the base station. The attenuation is selected, for instance, to provide the signal to the receiver circuitry of the base station with a selected level of gain.

In one implementation, the level of attenuation is dynamically determined, that is to say, the level of attenuation is determined responsive to the values of the signals applied to the attenuator. For instance, a cable attenuation detector, in one implementation, is used to detect the cable loss exhibited by the cable and to provide indications of detections made thereat to the attenuator. The attenuation of the attenuator is, in part, responsive thereto.

In another implementation, determinations are made of at least relative signal quality indications, and the level of attenuation of the attenuator is responsive, in part, to such determinations.

Thereby, through operation of an embodiment of the present invention, improved noise figure characteristics and linearity characteristics are possible relative to conventional receiving stations. By providing a high level of amplification at the mast head amplifier and selectively attenuating the signal prior to its application to receiver circuitry of the radio base station, an improved noise figure is provided while also maintaining the linearity of the receiver system and maintaining low distortion of the received signals.

In these and other aspects, therefore, apparatus, and an associated method, selectively modifies characteristics of the receive signal received at a radio base station. The radio base station has a mast head coupled to receiver circuitry by way of a cable. A cable loss is associated with the cable, and a receive signal exhibits a loss corresponding to the cable loss when the receive signal is conducted through the cable. A mast head amplifier is coupled in-line between the mast head and the cable. The mast head amplifier amplifies the receive signal at a mast head level. The mast head amplification is of a value of gain greater than the cable loss. An attenuator is coupled in-line between the cable and the receiver circuitry. The attenuator selectively attenuates the receive signal prior to application to the receiver circuitry.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
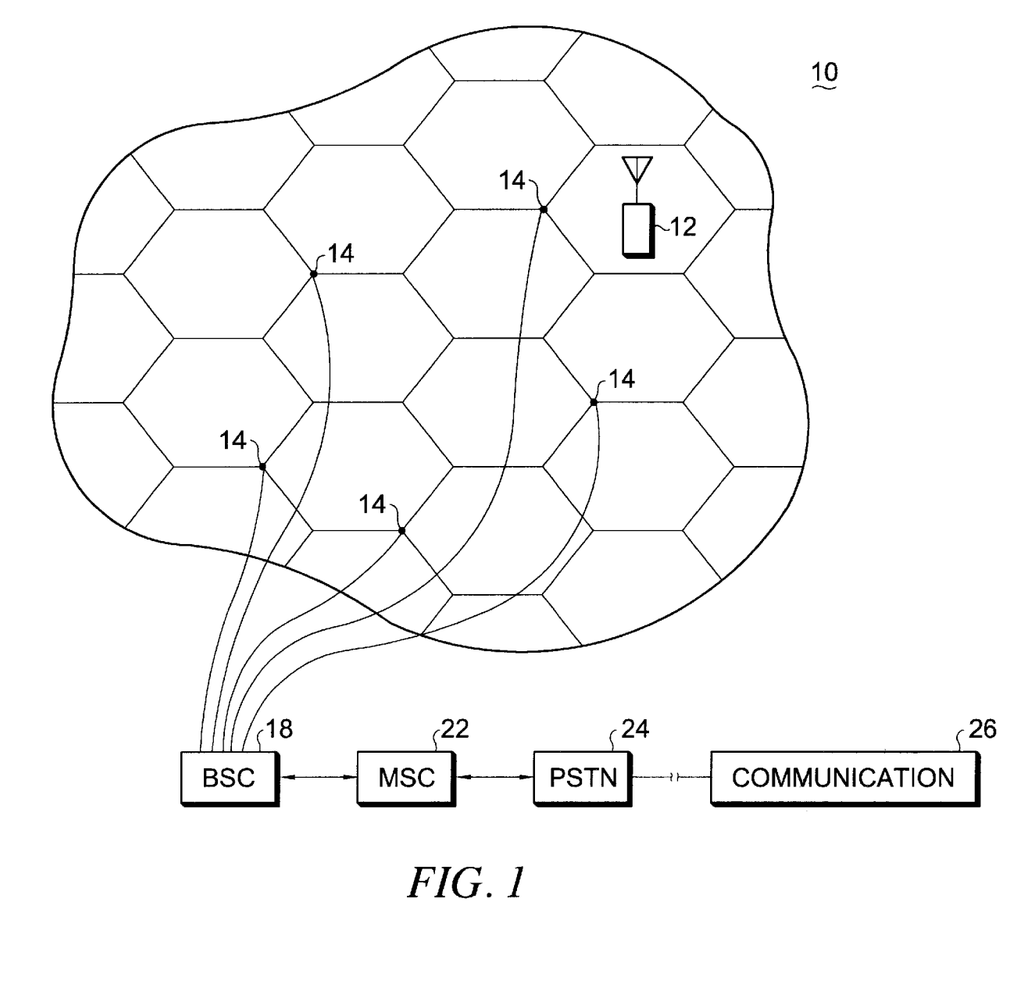
FIG. 1 illustrates a functional representation of a cellular communication system and the positioning of radio base stations of the system and whereas an embodiment of the present invention is operable.

Referring first to FIG. 1, a portion of a cellular communication system, as shown generally at 10, permits two-way radio communications with mobile stations, of which the mobile station 12 is exemplary, when a mobile station is positioned within a geographical area encompassed by the system. The network infrastructure of the cellular communication system includes a plurality of spaced-apart radio base stations 14. The base stations 14 are positioned at selected locations throughout the geographical area to be encompassed by the communication system.

In the implementation shown in the Figure, sets of three radio base stations 14 are grouped together at common locations to define sector cells, in conventional manner.

Groups of the radio base stations 14 are coupled to a BSC (base station controller) 18. A BSC is operable to control operation of the radio base stations coupled thereto. And, groups of BSCs 18 are coupled in turn to an MSC (mobile switching center) 22. An MSC performs switching operations and is coupled to a PSTN (public-switched telephonic network), here the PSTN 24. The PSTN is coupled to communication stations, such as the communication station 26, here a conventional, wire-line terminal.

Telephonic communication is effectuated between, for instance, the mobile station 12 and the communication station 26 by way of the PSTN 24, the network infrastructure including the MSC 22, BSC 18, and a radio base station 14 to which the mobile station 12 is proximate by way of a radio link formed between the mobile station and the radio base station. To better effectuate the communication of radio signals upon the radio channels formed between the mobile station and the radio base station, antenna transducer elements, referred to as mast heads, are positioned, many times to be elevated above other portions of the radio base station 14.

Typically, the mast head is coupled to other circuitry of the radio base station by way of a cable. However, as noted above, cable loss is associated with the cable, and a signal conducted through the cable exhibits a loss corresponding to the cable loss. Operation of an embodiment of the present invention provides a manner by which to overcome such cable loss to provide receiver circuitry of the radio base station with a signal which exhibits good noise figure characteristics and which also is of good linearity.

Figure 2:
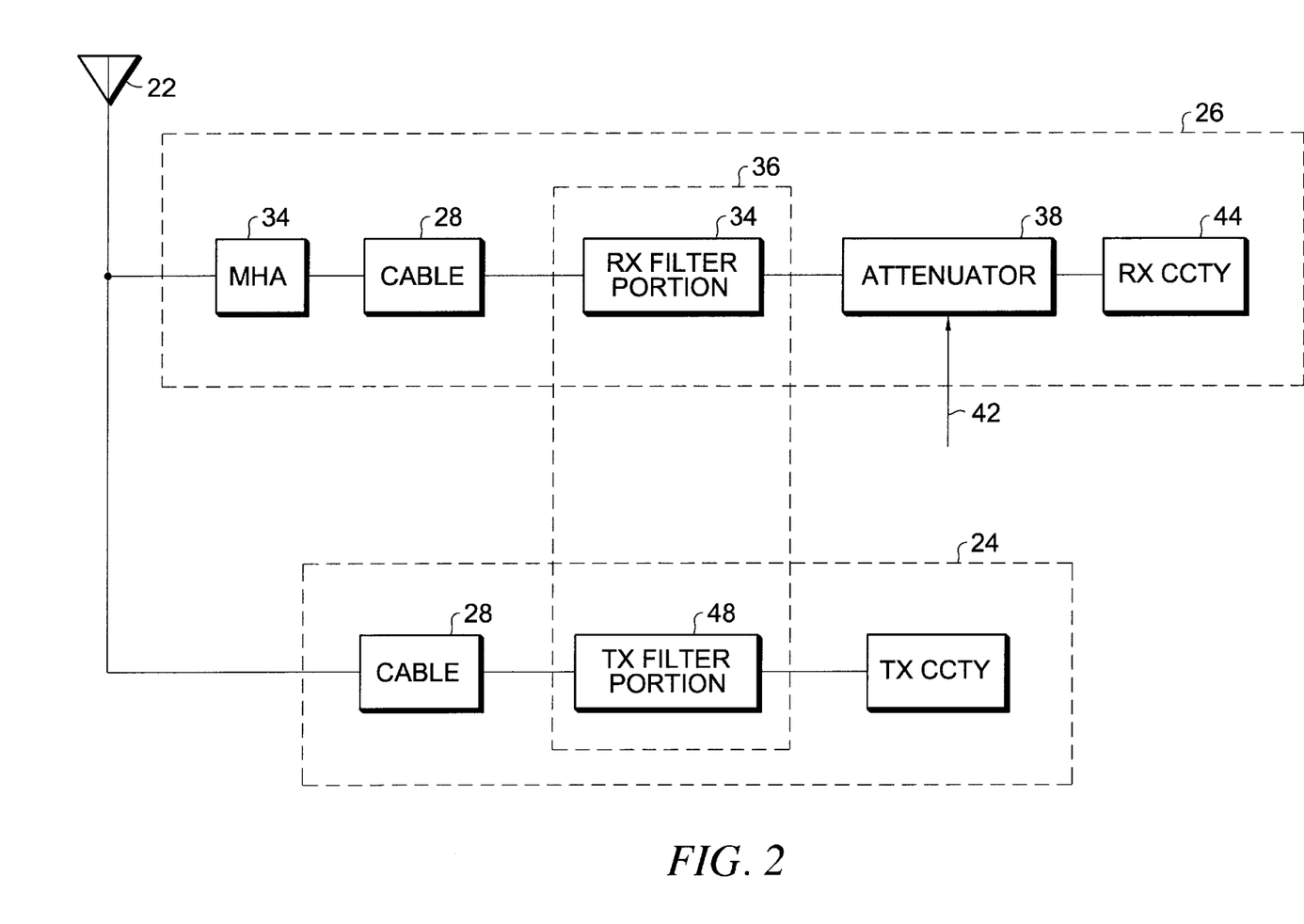
FIG. 2 illustrates a functional block diagram of a radio base station which includes an embodiment of the present invention as a portion thereof.

FIG. 2 illustrates a radio base station 14, exemplary of a base station which forms a portion of the network infrastructure of the cellular communication system 10 shown in FIG. 1. The radio base station 14 includes an embodiment of the present invention as a portion thereof. The base station includes a mast head 22 operable to transduce reverse link signals received thereafter into electrical form and also to transduce forward link signals for transmission therefrom into electromagnetic form.

The radio base station includes both a transmitter portion 24 and a receiver portion 26 to permit transceiving of both forward-link and reverse-link signals respectively. To facilitate communications, the mast head 22 is typically positioned at an elevated location, often separated from other portions of the radio base station. The mast head 22 is oftentimes, therefore, coupled to the transmitter and receiver portions 24 and 26 of the base station by way of a cable 28.

The base station 18 includes a mast head amplifier (MHA) 32 positioned proximate to the mast head 22, in-line between the mast head and the cable 28 extending to the receiver portion 26. In the exemplary implementation, the mast head amplifier is of a constant amplification level. In other implementations, the amplification level is, conversely, of a selectable gain level. The amplification level is, however, selected to be substantially greater, for example, two times as large, as the cable loss associated with conduction of a signal through the cable 28. When at such an amplification level, signal levels of a received signal, subsequent to conduction through the cable 28, are of signal levels greater than signals level of the signal when applied to the amplifier 32.

Thereby, when a received signal is provided to the receiver portion 26 of the radio base station, the signal is of an amplified signal level. As illustrated, the cable 28 is coupled to the receive filter portion 34 of a filter duplexer 36. The receive filter portion exhibits a filter pass band of a selected bandwidth for passing received signals within such pass band and for rejecting signals beyond such pass band. Received signals passed by the receive filter portion 34 are applied to an attenuator 38. The attenuator attenuates the signals applied thereto with a selected level of attenuation. Control signals for controlling the levels of attenuation by which the attenuator attenuates the receive signals applied thereto are applied to the attenuator by way of the line 42. Levels of attenuation by which the attenuator 38 attenuates the receive signals are, in the exemplary implementation, dynamically determined. In one implementation, a determination is made of the cable loss associated with the cable 28, and the attenuation level of the attenuator is selected responsive thereto. In another implementation, the signal levels of the signal component portions of the received signal are determined, and the level of attenuation is selected responsive thereto. In another implementation, relative signal characteristics of a signal from selected portions of the received signal are evaluated, and the level of attenuation by which the attenuator attenuates the signals applied thereto is selected responsive thereto.

Once attenuated by the attenuator 38, the receive signals are applied to other portions of the receiver portion 26 of the radio base station, here represented by the receiver circuitry 44. Conventional receiver circuitry functions are performed thereat, such as down-conversation and demodulation operations. Appropriate selection of the level of amplification by which the amplifier 32 amplifies the received signals applied thereto, and thereafter, appropriate selection of the levels of attenuation by which the attenuator 38 attenuates signals applied thereto ensures that signals which exhibit appropriate levels of linearity and noise figures are applied to the receiver circuitry 44.

The radio base station is further shown to include transmitter circuitry 46 operable to generate transmit signals which are applied to a transmit filter portion 48 of the filter duplexer 36, thereafter to be conducted through the cable 28 and transduced by the mast head 22.

Figure 3:
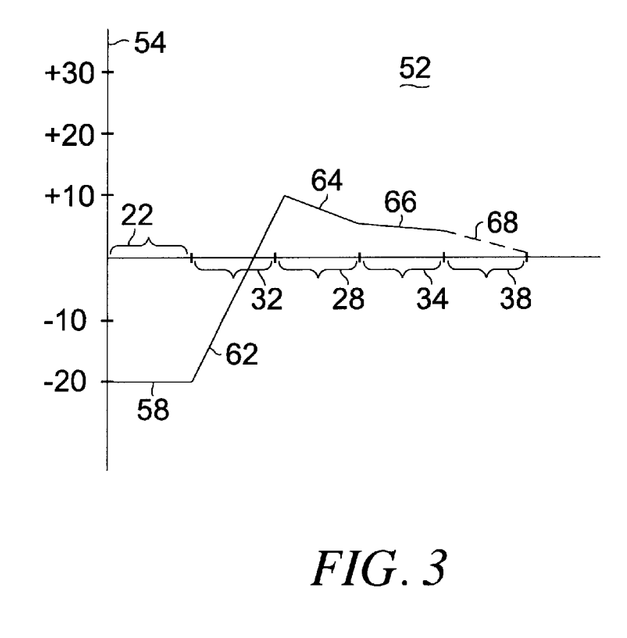
FIG. 3 illustrates a graphical representation of the gain of a signal at different locations of the receiver portion of the radio base station shown in FIG. 2.

FIG. 3 illustrates a graphical representation, shown generally at 52, representing the levels of gain associated with a receive signal at various stages during its reception at the radio base station 14. The gain is plotted along the ordinate axis 54 as a function of the location of the signal at the various elements of the radio base station along the abscissa axis 56. The graphical representation 52 is exemplary. That is to say, the levels of gain and attenuation associated with various components of the radio base station may be of different values at different times of its operation and, in other implementations, the values can be other than those shown.

A first segment 58 is representative of the electrical signal formed by the mast head 22 responsive to detection of an electromagnetic signal at the mast head. The signal level of the electrical signal generated by the mast head 22 is here shown to be of a signal level of minus 20 dBm.

The segment 62 is representative of amplification of the receive signal by the mast head amplifier 32. Here, the mast head amplifier provides amplification of 30 dBm to the signal applied thereto. The segment 64 is representative of the cable loss associated with the cable 28 and which is exhibited by the conduction of the signal through the cable. Here, the cable loss is of a value of 5 dBm. The segment 66 is representative of the loss exhibited by the receive signal when conducted through the receive filter portion 34 of the filter duplexer 36. Here, the loss is of a 1 dBm level.

The segment 68, shown in dash, is representative of the level of attenuation by which the attenuator 38 attenuates the receive signal when the receive signal is applied thereto. As the level of attenuation of the attenuator is selectable, such amount of attenuation can be varied. Here, the attenuation is selected to be of 5 dBm. The signal is thereafter applied to receiver circuitry 44 to be processed thereat.

Analysis of the graphical representation 52 indicates that, because of the high level of amplification of the mast head amplifier 32, the receive signal, when applied to the receiver circuitry is of a substantially greater amplitude than when the receive signal is initially applied to the mast head amplifier.

Figure 4:
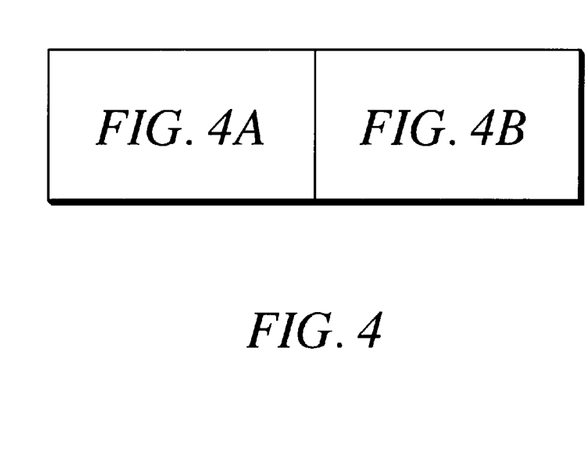
FIG. 4 illustrates a functional block diagram of a radio base station of a further embodiment of the present invention.
Figure 4A:
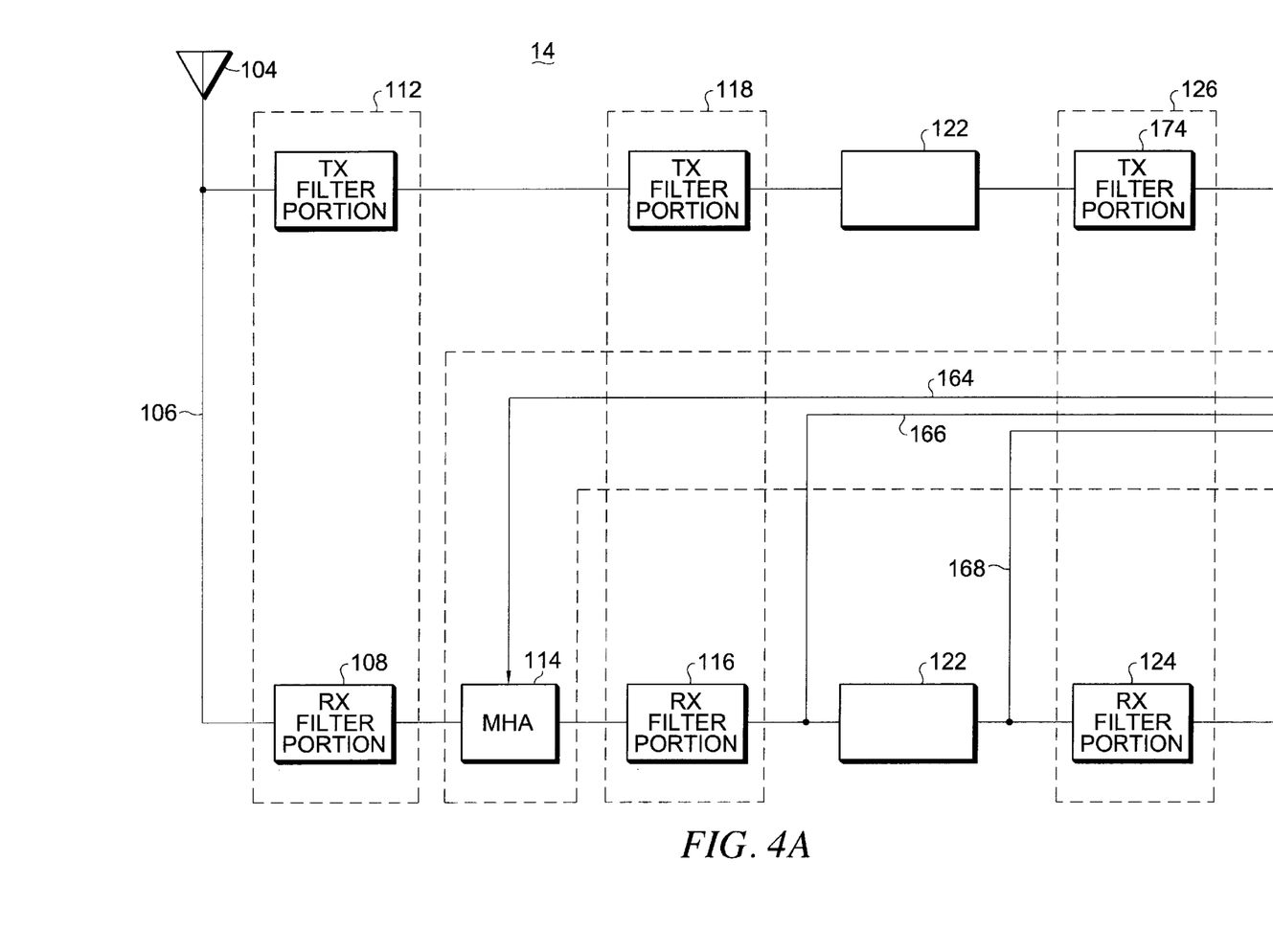
Figure 4B:
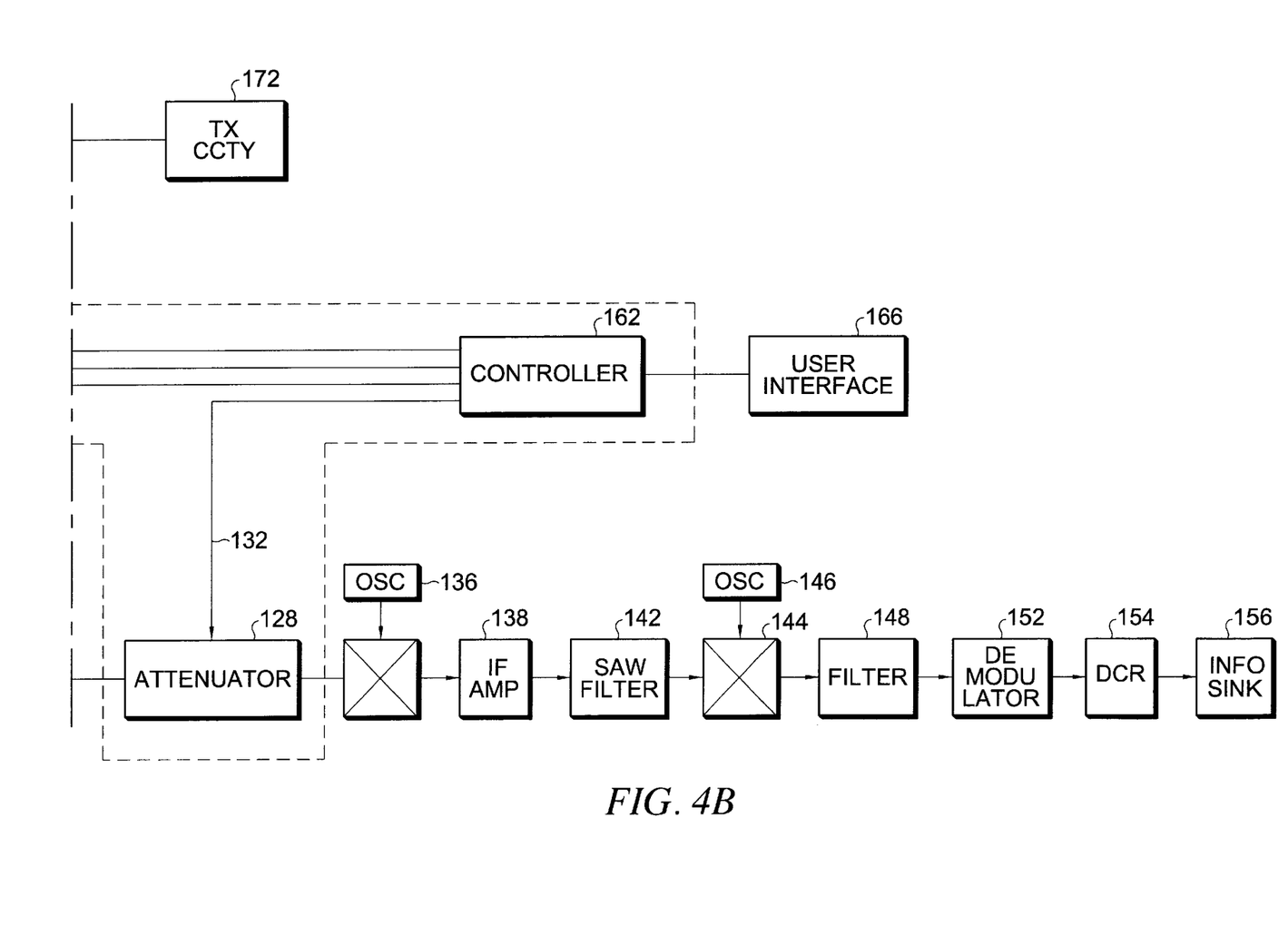

FIG. 4 illustrates a radio base station 14 which includes the apparatus of a further embodiment of the present invention. Again, the radio base station 14 is exemplary of a base station operable in a cellular communication system. In other embodiments, however, the radio base station is exemplary of other types of radio transceives, or more specifically, radio receiver, apparatus operable in other radio communication systems.

The radio base station 14 here includes a mast head 104 again operable to transduce forward-link and reverse-link communication signals into and out of electromagnetic form. A reverse-link signal detected by the mast head 104 is converted into electrical form on the line 106 and applied to a receive filter portion 108 of a filter duplexer 112. Components of the signal applied to the filter portion 108 within the pass band thereof are passed and thereafter provided to a mast head amplifier (MHA) 114. The mast head amplifier 114 here exhibits a relatively high, e.g., 30 dB constant gain level. Such relatively high levels gain is in contrast to conventional mast head amplifiers which are typically set to be of a relatively low level of gain, e.g., 12 dB.

Once amplified, the signal is applied to a receive filter portion 116 of a second filter duplexer 118, and signals within the pass band of the filter portion 116 are passed therefrom. The signal is thereafter conducted through an antenna feeder cable 122 which has a cable loss associated therewith. The gain of the mast head amplifier 114, however, is set to be of a level substantially greater than the loss associated with the cable 122. Thereby, a signal conducted therethrough exhibits a loss corresponding to the cable loss is more than offset by the amplification of the signal at the amplifier 114. In one implementation the cable 122 is duplexed, viz., the same cable 122 is used to carry both receive and transmit signals with filter duplexers positioned at both sides of the cable, as shown.

Thereafter, the signal is applied to a receive filter portion 124 of the filter duplexer 126. Components within the pass band of the receive filter portion 124 are applied to an adjustable attenuator 128. The level of attenuation exhibited by the attenuator is selected by way of a control signal applied thereto, here by way of the line 132.

Once attenuated, the signal is applied to an input terminal of a first down-mixer 134. A first down-mixing signal is applied to a second input terminal of the down-mixer 134, here represented to be generated by an oscillator 136.

The down-mixer 134 generates a first down-mixed signal which is applied to an intermediate frequency (IF) amplifier 138 to be amplified thereat. An amplified signal generated by the amplifier 138 is applied to a saw filter 142. A filtered signal generated by the filter 142 is applied to a first input terminal of a second down-mixer 144. A second down-mixing signal is applied to a second input terminal of the down-mixer 144, here represented to be generated by an oscillator 146.

The second down-mixer 144 generates a second down-mixed signal, here a base band signal, which is applied to a filter 148.

Filtered signals passed by the filter 148 are applied to a demodulator 152. Demodulated signals formed by the demodulator 152 are decoded by decoder 154 and thereafter applied to a data-sink 156.

The radio base station 14 further includes a controller 162 operable, amongst other things, to generate the control signal 132 which is used to control the level of attenuation of the attenuator 128. In one implementation, the controller 162 is further operable to, maintain the level of amplification of amplification of the mast head amplifier 114. In the exemplary implementation, the controller 162 is operable to execute algorithms to perform measurement and control functions in the generation of control signals on the lines 132 and 164.

In one implementation, external inputs are provided to the controller 162, here by way of a software interface 166, and such external inputs are used by the controller to control the selection of the values of control signals generated by the controller 162. In another implementation, determinations are made by the controller 162 as to the amount of cable loss exhibited by a signal conducted through the feeder cable 122. Such determination can be made, for instance, by determinations of signal levels before and after the cable 122, here provided by way of the lines 166 and 168. And, in another implementation, determinations of signal characteristics of the receive signal, such as the signal strength of the receive signal, of the signal-to noise ratio (SNR), or another signal quality determination is made to determine the level of attenuation at which the attenuator should attenuate signals applied thereto.

In a TDMA (time-division multiple access) communication system, selection of the level of attenuation by which the attenuator 128 attenuates signals applied thereto can be made to the dynamically-determined values of signal levels at each time slot. If the signal is very weak and no strong interfering signals form components of the signal passed through the radio base station, the level of attenuation exhibited by the attenuator can be selected to be of a smaller value thereby to detect better signals of low signal levels. An increased front-end gain thereby decreases the noise figure effects from the rest of the receiver, to ensure accuracy of the RSSI software.

Conversely, if strong interfering signals form components of the receive signal passed through the radio base station, such level of interference dominates the achievable sensitivity. At high levels of interfering signals, the level of attenuation exhibited by the attenuator 128 is increased to make the receiver become more linear, that is to say, thereby to increase IIP3 (third order input intercept point). Such principles can be used to optimize the receiving performance of the radio base station, either dynamically based upon measurements performed operation of the base station, or by way of external inputs to the base station. Improved linearity results. Conventionally, portions of the receiver, the "receiver chain," subsequent to the adjustable attenuator limits achievable linearity. If signals of lower signals are passed through the receiver, clearly lower intermodulation products fall to the received channel. If an increased attenuation, e.g., 2 dB of increased attenuation, is used in a situation in which the dominating elements controlling receiver linearity are positioned subsequent to the attenuator, a 3:1 improvement, e.g., improvement of disturbing intermodulation product levels results, e.g., a 2 dB to 6 dB improvement.

By providing a high level of gain at the mast head amplifier, the loss exhibited by the signal when the signal is passed through the antenna feeder cable is more than overcome by such gain. Thereby, the signal applied to the remaining portions of the receiver portion of the radio base station exhibits a noise figure which is primarily defined by the mast head amplifier. The remaining portions of the receiver portion of the base station need not be overdriven, and the modulation products are thereby unlikely to disturb operation of the receiver portion of the radio base station.

The radio base station 14 is further shown to include transmitter circuitry 172 forming part of the transmit portion of the base station, coupled to the transmit filter portion 174 of the duplexer 126.

Figure 5:
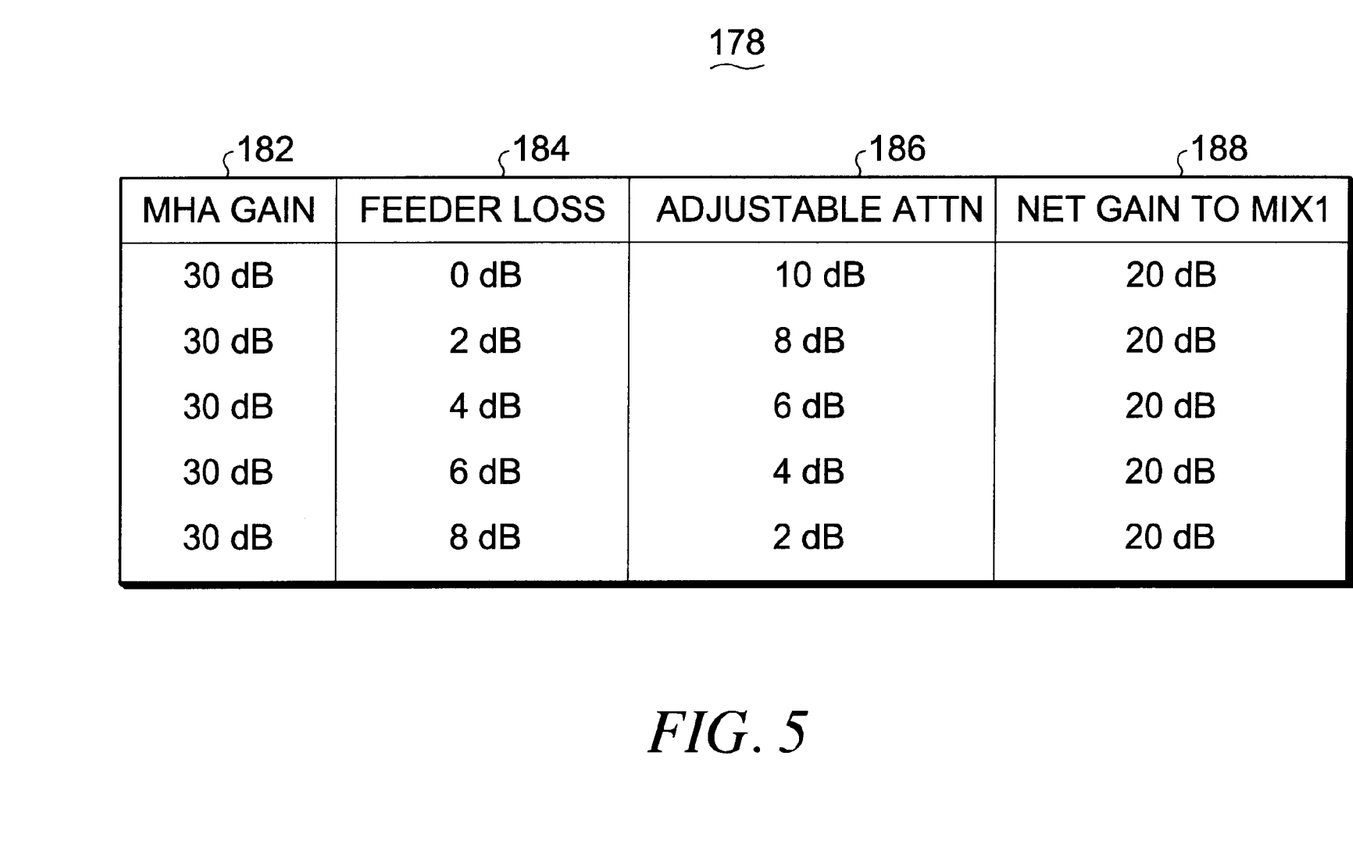
FIG. 5 illustrates a table listing the gain added to, or loss removed from, a signal at various locations of the radio base station shown in FIG. 4.

FIG. 5 illustrates a table, shown generally at 178 which lists exemplary gain and loss amounts at various portions of the radio portion of the radio base station in various scenarios. The gain introduced upon the signal by the mast head amplifier, shown in column 182, is typically high, and here, in each instance, is of 30 dB. Various levels of antenna feeder cable loss are listed in the column 184. Exemplary feeder losses are of 0 dB, 2 dB, 4 dB, 6 dB, and 8 dB.

The column 186 lists various levels of attenuation exhibited by the attenuator, responsive to the different levels of antenna feeder cable loss listed in the column 184. Decreasing levels starting with 10 dB, and reducing in two dB increments to an attenuation of 2 dB are listed in the column. The net gain provided to remaining portions of the receiver portion of the radio base station are listed in the column 188. As shown, here, the adjustable attenuation exhibited by the attenuator 128 is selected such that the net gain of the signal applied to the remaining portions of the receiver portion of the radio base station is of a 20 dB level. In this illustration, the net gain in front of the receiver of the radio base station is always of a level of 20 dB. While the noise figure exhibited by the receiver for the radio base station is primarily defined by the mast head amplifier, and the intermodulation product is unlikely to deleteriously affect receiver operation of the radio base station.

Figure 6:
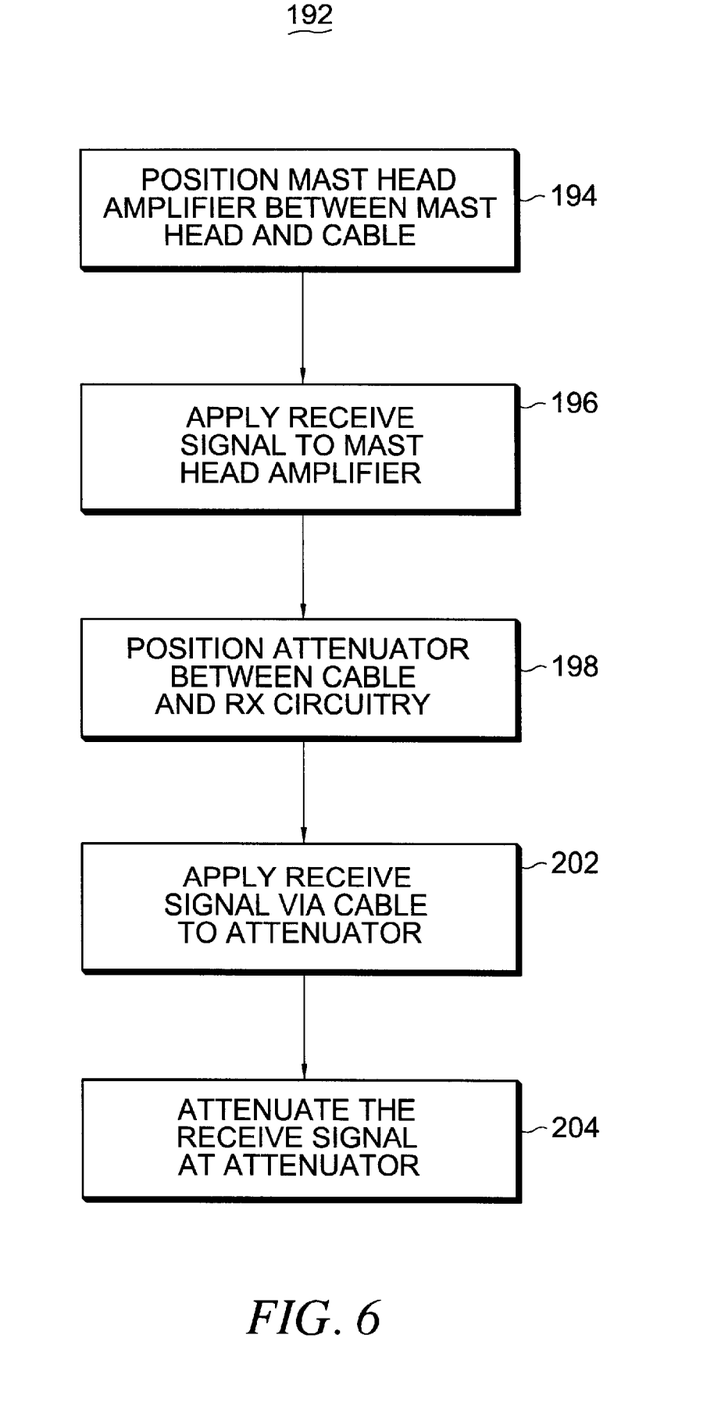
FIG. 6 illustrates a method flow diagram listing the method steps of the method of operation of an embodiment of the present invention.

FIG. 6 illustrates a method, shown generally at 192, of an embodiment of the present invention. The method selectively modifies characteristics of a receive signal received at a mast head of the radio base station. The radio base station includes receiver circuitry coupled to the mast head by way of a cable, thereby to provide the receive signal received at the mast head to the receiver circuitry.

First, and as indicated by the block 194, a mast head amplifier is positioned in-line between the mast head and the cable. The mast head amplifier exhibits a mast head amplification level greater than a cable loss exhibited by the cable. Then, and as indicated by the block 196, the receive signal is applied to the mast head amplifier to be amplified thereat.

Then, and as indicated by the block 198, an attenuator is positioned in-line between the cable and the receiver circuitry. And, as indicated by the block 202, the receive signal once amplified during the operation of amplifying, is applied by way of the cable to the attenuator. Finally, and as indicated by the block 204, the receive signal is attenuated at a selected level of attenuation.

The previous descriptions are of preferred examples for implementing the invention and the scope of the invention should not necessarily be limited by this description. The scope of the present invention is defined by the following claims:

What is claimed is:

1. In a radio base station having a mast head coupled to receiver circuitry by way of a cable, the cable having an input connected to receive a low-magnitude signal from the mast head and having an output connected to an input of the receiver circuitry, and the cable exhibiting a cable loss when a signal is conducted therethrough, apparatus for selectively modifying the low-magnitude signal, said apparatus comprising:

a mast head amplifier coupled in-line between the mast head and the input of the cable, the mast head amplifier for amplifying the low-magnitude signal at an amplification level that is at least twice the cable loss such that a signal at the output of the cable is a high-magnitude signal;

an attenuator coupled in-line between the output of the cable and the receiver circuitry, the attenuator for selectively attenuating the high-magnitude signal prior to an input of the receiver circuitry; and the selective attenuation being such that an intermediate-magnitude signal is applied to the input of the receiver circuitry, the selective attenuation selected to provide the receiver circuitry with a predetermined amount of gain, the intermediate-magnitude signal being of a lower magnitude than the high-magnitude signal and of a substantially greater magnitude than the low-magnitude signal, the intermediate-magnitude signal having a noise figure dependent on the amplification level.

2. The apparatus of claim 1 wherein the amplification level is constant.

3. The apparatus of claim 1 wherein the attenuator is adjustable to permit adjustable selection of attenuation by the attenuator.

4. The apparatus of claim 3 wherein the radio base station includes a software interface, and wherein selection of attenuation is made by way of the software interface.

5. The apparatus of claim 1 further comprising a cable-attenuation detector coupled to the cable, the cable-attenuation detector for detecting the cable loss exhibited by the cable, and the cable-attenuation detector coupled to the attenuator for selecting attenuation as a function of the detected cable loss.

6. The apparatus of claim 1 wherein the radio base station is operable in a TDMA (Time Division Multiple Access) communication system in which time frames formed of sequences of time slots are defined, and wherein the attenuator selectively attenuates the high-magnitude signal at different levels of attenuation during different ones of the time slots.

7. The apparatus of claim 1 wherein the attenuator dynamically attenuates the high-magnitude signal.

8. The apparatus of claim 1 including a signal level measurer for comparing a signal strength of signal portions of the low-magnitude receive signal to a signal strength of non-signal portions of the low-magnitude signal, and wherein attenuation by the attenuator is selected at least partly responsive to the comparison of the relative signal strengths of the signal portions to the non-signal portions.

9. The apparatus of claim 8 wherein attenuation by the attenuator is relatively low when a signal strength of the signal portions is relatively high as compared to a signal strength of the non-signal portions, and wherein attenuation by the attenuator is relatively high when a signal strength of the signal portions is relatively low as compared to a signal strength of the non-signal portions.

10. A method for selectively modifying a low-magnitude signal that is provided by a mast head of a radio base station, the radio base station including receiver circuitry coupled to the mast head by way of a cable that exhibits a cable loss, thereby providing an input signal to the receiver circuitry, the method comprising the steps of:

positioning a mast head amplifier in-line between the mast head and an input of the cable, the mast head amplifier exhibiting amplification that is at least twice as large as the cable loss exhibited by the cable;

applying the low-magnitude signal to the mast head amplifier to be amplified thereat, the mast head amplifier thereby providing a high-magnitude signal to the input of the cable;

positioning an attenuator in-line between the output of the cable and the receiver circuitry, to thereby apply an intermediate-magnitude signal to the input of the receiver circuitry, the intermediate-magnitude signal having a noise figure dependent on the amplification level of the mast head amplifier; and controlling the attenuator such that the intermediate-magnitude signal is of a lower magnitude than the high-magnitude signal and is of a substantially greater magnitude that the low-magnitude signal, the attenuator controlled such that the receiver circuitry is provided with a predetermined amount of gain.

11. The method of claim 10 wherein amplification by the mast head amplifier is constant.

12. The method of claim 10 wherein the step of controlling the attenuator includes detecting the cable loss exhibited by the cable and selecting attenuation responsive, at least in part, to the detected cable loss.

13. The method of claim 10 wherein the step of controlling the attenuator includes comparing relative signal levels of portions of the low-magnitude signal, and selecting an attenuation responsive, at least in part, to the comparison.

14. The method of claim 13 wherein the relative signal levels portions that are compared comprise signal portions of the low-magnitude signal and non-signal portions of the low-magnitude signal.

15. Apparatus for a radio base station having a mast head for transducing a low-magnitude signal into an electrical form, and having receiver circuitry coupled to the mast head by way of a cable, the apparatus comprising:

a mast head amplifier coupled between the mast head and the cable, the mast head amplifier for amplifying the electrical form of the low-magnitude signal by an amount that is twice as great as a cable loss resulting from signal conduction through the cable, an output of the mast head amplifier comprising a high-magnitude signal;

an attenuator coupled between the cable and the receiver circuitry, the attenuator for attenuating signals by a selected attenuation level, the selected attenuation level being selected to provide a signal to the receiver circuitry with a selected gain, and an output of the attenuator comprising an intermediate-magnitude signal; and the selected attenuation being such that the intermediate-magnitude signal is lower in magnitude than the high-magnitude signal and is substantially greater in magnitude than the low-magnitude signal, the intermediate-magnitude signal having a noise figure dependent on the amplification level of the mast head amplifier.

* * * * *